(12) United States Patent
Okuhata et al.

(10) Patent No.: US 11,092,468 B2
(45) Date of Patent: Aug. 17, 2021

(54) ELECTROPOTENTIAL DETECTION ELECTRODE OF ELECTROMAGNETIC FLOW METER

(71) Applicant: Azbil Corporation, Tokyo (JP)

(72) Inventors: Kazuko Okuhata, Tokyo (JP); Koji Kimura, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 245 days.

(21) Appl. No.: 16/218,851

(22) Filed: Dec. 13, 2018

(65) Prior Publication Data
US 2019/0186963 A1 Jun. 20, 2019

(30) Foreign Application Priority Data

Dec. 15, 2017 (JP) .............................. JP2017-240922

(51) Int. Cl.
| | |
|---|---|
| *G01F 1/58* | (2006.01) |
| *G01N 27/06* | (2006.01) |
| *G01N 27/08* | (2006.01) |
| *G01N 27/07* | (2006.01) |
| *G01F 1/60* | (2006.01) |

(52) U.S. Cl.
CPC ............. *G01F 1/584* (2013.01); *G01N 27/06* (2013.01); *G01N 27/07* (2013.01); *G01N 27/08* (2013.01); *G01F 1/588* (2013.01); *G01F 1/60* (2013.01)

(58) Field of Classification Search
CPC ............ G01F 1/584; G01F 1/588; G01F 1/60; G01N 27/06; G01N 27/07; G01N 27/08
See application file for complete search history.

(56) References Cited

U.S. PATENT DOCUMENTS 4,782,709 A  11/1988 Goto et al.

FOREIGN PATENT DOCUMENTS

| CN | 86 1 05077 A | 2/1987 |
| JP | H02-16024 U | 2/1990 |
| JP | 2018-146274 A | 9/2018 |

OTHER PUBLICATIONS

The State Intellectual Property Office of People's Republic of China, "The First Office Action", issued in Chinese Patent Application No. 201811523815.2, which is a counterpart to U.S. Appl. No. 16/218,851, dated Mar. 23, 2020, 15 pages (9 pages of English Translation of Office Action and 6 pages of Original Chinese Office Action).

*Primary Examiner* — Paul M. West

(57) ABSTRACT

A liquid-contact portion exposed into a measurement tube is provided, and a main body portion formed by covering a base material with a conductor and a terminal portion electrically connected to the conductor are provided. The base material includes first to fifth end surfaces extending in a direction crossing a radial direction of the measurement tube and first to fourth side surfaces extending in the radial direction from end edges of the end surfaces. Grooves each connected at one end thereof to the end surface and at the other end thereof to the side surface are formed on an outer boundary portion, which is a boundary portion between the end surface and the side surface and projects outward of the main body portion.

3 Claims, 6 Drawing Sheets

ELECTROPOTENTIAL DETECTION ELECTRODE OF ELECTROMAGNETIC FLOW METER

CROSS-REFERENCE TO RELATED APPLICATION

The present application claims the benefit of and priority to Japanese Patent Application No. 2017-240922, filed on Dec. 15, 2017, the entire contents of which are incorporated by reference herein.

TECHNICAL FIELD

The present invention relates to an electropotential detection electrode of an electromagnetic flow meter, which has a main body portion comprising a liquid-contact portion covered with an electrically conductive material.

BACKGROUND

Some electromagnetic flow meters of the related art are configured to extract an electromotive force generated in a fluid flowing in a measurement tube by using an electropotential detection electrode. The electropotential detection electrode, typically made of a stainless steel, is made of various materials depending on corrosiveness of detection targets. Examples of electrode materials having high corrosive resistance include precious metal materials such as platinum as disclosed, for example, in PTL 1 in many cases. The precious metal materials have such a disadvantage as having difficulty to achieve desired shapes depending on the shape due to their low strength. In order to solve the disadvantage described above, forming an electrode by using a non-precious metal material as a base metal and covering the electrode with a precious metal material is conceivable as described in PTL 1.

However, when an abrasive substance is included in the fluid flowing in the measurement tube, the precious metal material covering the electrode may be peeled off. In addition, the precious metal material covering the electrode may be peeled off due to an impact applied to the measurement tube, corrosion of the measurement tube, or a defect at the time of manufacture.

When the precious metal material is peeled off, an electrochemical noise is generated due to an electropotential difference between the base metal and the precious metal material. This noise corresponds to an output noise from the electromagnetic flow meter.

The problem of generation of the noise due to peeling off of the metal material that covers the electrode may be solved by making an electrode body with an insulating material, covering a surface of the insulating material with a precious metal material, and using the precious metal material as a conduction path as proposed by an applicant of the present application in PTL 2. Described in PTL 2 is an electropotential detection electrode 3 having such structure that a base material 1 made of a ceramic, which is an insulating material, is covered with a conductor 2 made of a metal having corrosive resistance, as illustrated in FIG. 9. The electropotential detection electrode 3 includes a first small diameter portion 3a to be inserted into a hole 5 formed in a measurement tube 4 for inserting an electrode, a large diameter portion 3b located outside the measurement tube 4, and a second small diameter portion 3c projecting from the large diameter portion 3b in a direction opposite from the first small diameter portion 3a. A lead wire 6 is connected to the second small diameter portion 3c.

CITATION LIST

Patent Literature

[PTL 1] JP-UM-A-2-16024
[PTL 2] Japanese Patent Application No. 2017-038984

SUMMARY

The electropotential detection electrode of the related art illustrated in FIG. 9—that is, the electropotential detection electrode 3 formed by covering the base material 1 that serves as a base of the electrode with the conductor 2—tends to be partly reduced in thickness at corners 7 of the formed conductor 2, and thus the conductor 2 may not be able to have a thickness required for detecting signals, as illustrated in FIG. 10. The corners 7 are formed at boundary portions between a distal end surface 1a and side surfaces 1b of the base material 1. When the thickness is reduced at the corners 7, reliability of conduction is lowered, and thus conductivity required for detecting signals is not achieved.

In this manner, the reason why the thickness is partly reduced at the corners 7 seems to be because formation of the conductor 2 is achieved by a metal paste sintering method using a metal paste. Wettability of the surface of the base material 1 formed of a ceramic with respect to the metal paste may become low. Therefore, a contact angle between a sintered body formed by sintering the metal paste on one of surfaces of the corner 7 and a sintered body formed by sintering the metal paste on the other surface becomes large when a temperature becomes high, and thus the conductor 2 may swell on each surface due to a surface tension.

It is an object of the present invention to provide an electropotential detection electrode of an electromagnetic flow meter, which is capable of achieving sufficient conductivity required for detection of the potential at a corner irrespective of nature of a metal paste even though a conductor manufactured by sintering the metal paste is partly reduced in thickness at the corner.

In order to achieve the object, there is provided an electropotential detection electrode of an electromagnetic flow meter of the present invention comprising: a main body portion having a liquid-contact portion exposed in a measurement tube of the electromagnetic flow meter and being formed by covering a base material with an electrically conductive material; and a terminal portion electrically connected to the electrically conductive material, in which the base material comprises: an end surface extending in a direction intersecting a radial direction of the measurement tube; and a side surface extending in the radial direction of the measurement tube from an end edge of the end surface, and a groove is formed at a boundary portion between the end surface and the side surface, that is, an outer boundary portion projecting outward of the base material so as to be connected at one end thereof to the end surface and connected at the other end thereof to the side surface.

According to the electropotential detection electrode of the electromagnetic flow meter of the present invention, the terminal portion may be made of an electrically conductive material and formed separately from the main body portion, one end of the main body is the liquid-contact portion, the terminal portion may be electrically connected to the electrically conductive material by being overlapped with the other end of the main body portion via the electrically conductive material of the main body portion, and the groove may extend from an end surface of the one end of the base material to an end surface of the other end of the base material along an outer surface of the base material.

According to the electropotential detection electrode of the electromagnetic flow meter of the present invention, the base material may be made of a ceramic.

According to the present invention, when the metal paste is sintered on the main body portion, a contact angle between the sintered body made of the electrically conductive material in the groove and the sintered bodies made of the electrically conductive material covering the end surface side and the side surface side of the main body portion located at both sides of the groove is relatively smaller than the case of the related art because the groove is formed to extend across the end surface and the side surfaces. Therefore, the sintered bodies are easily connected to each other, and a surface tension acting on the sintered body in the groove and a surface tension acting on the sintered bodies located on both sides of the groove get balanced out.

Consequently, the sintered body stays in the groove during the sintering of the metal paste, and inside the groove is covered with the sintered body astride the outer boundary portion. Consequently, the conductor made of the sintered body formed on the end surface of the base material and the conductor made of the sintered body formed on the side surface are connected to each other via the conductor made of the sintered body in the groove.

Therefore, the present invention provides an electropotential detection electrode of an electromagnetic flow meter, which is capable of achieving sufficient conductivity required for detection of the potential at a corner irrespective of the nature of a metal paste even though a conductor manufactured by sintering the metal paste is partly reduced in thickness at the corner.

DETAILED DESCRIPTION

First Embodiment

Figure 1:
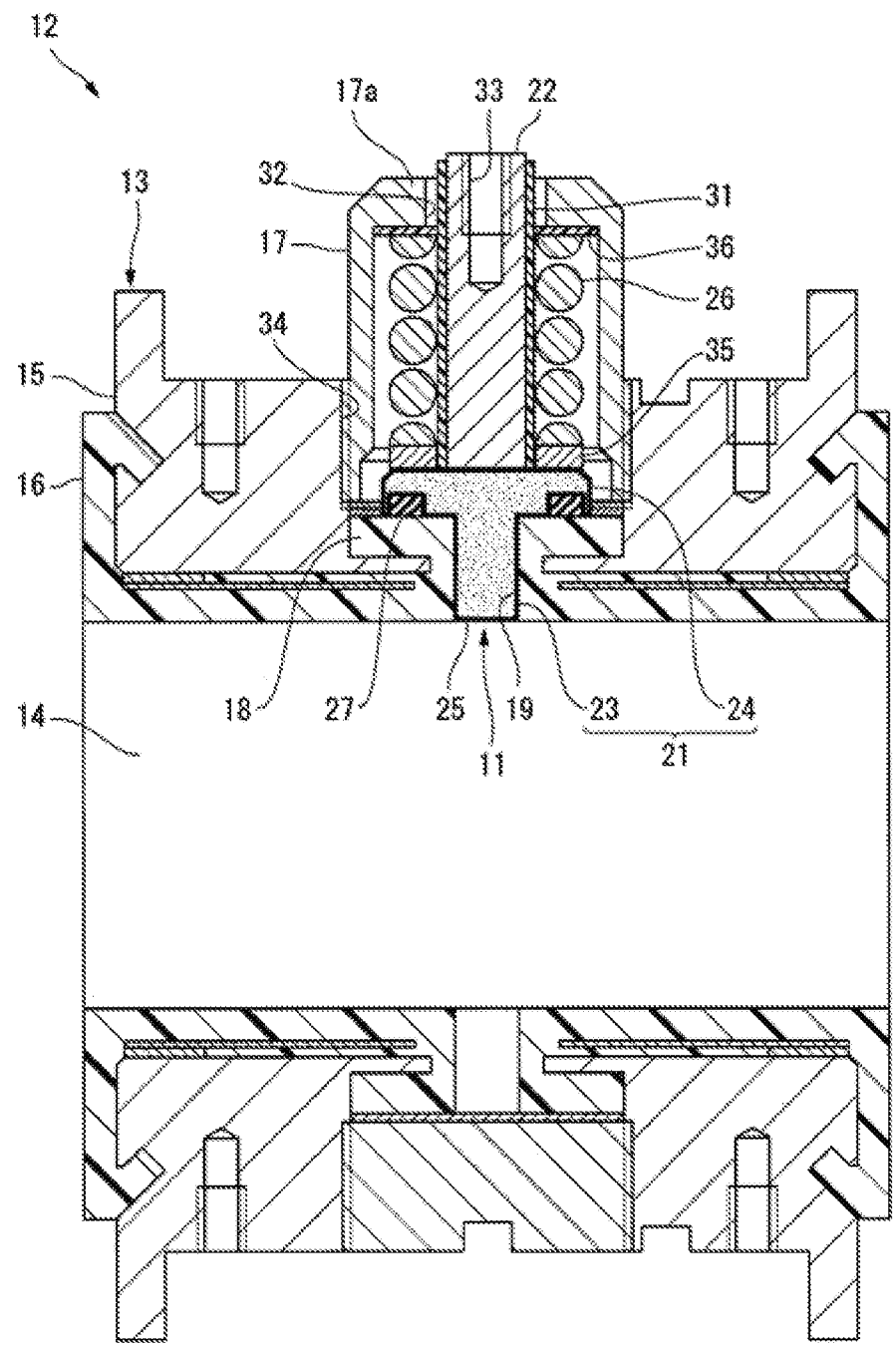
FIG. 1 is a cross-sectional view of an electromagnetic flow meter provided with an electropotential detection electrode according to the present invention.

Referring now to FIG. 1 to FIG. 5, an embodiment of an electropotential detection electrode of an electromagnetic flow meter according to the present invention will be described in detail below.

An electropotential detection electrode 11 illustrated in FIG. 1 (hereinafter, referred to simply as an electrode 11) is attached to a measurement tube 13 of an electromagnetic flow meter 12 from outside a fluid path 14.

The measurement tube 13 comprises a main body 15, a lining 16 provided on an inner surface of the main body 15, and an electrode cap 17 having a bottomed cylindrical shape for storing the electrode 11. The lining 16 is integrally provided with an electrode mounting seat 18. The electrode mounting seat 18 is provided with an electrode insertion hole 19 therethrough for inserting the electrode 11.

The electrode 11 according to the embodiment comprises a main body portion 21 inserted into the electrode insertion hole 19 of the lining 16, and a terminal portion 22 formed separately from the main body portion 21 and overlapped with the main body portion 21.

Figure 2:
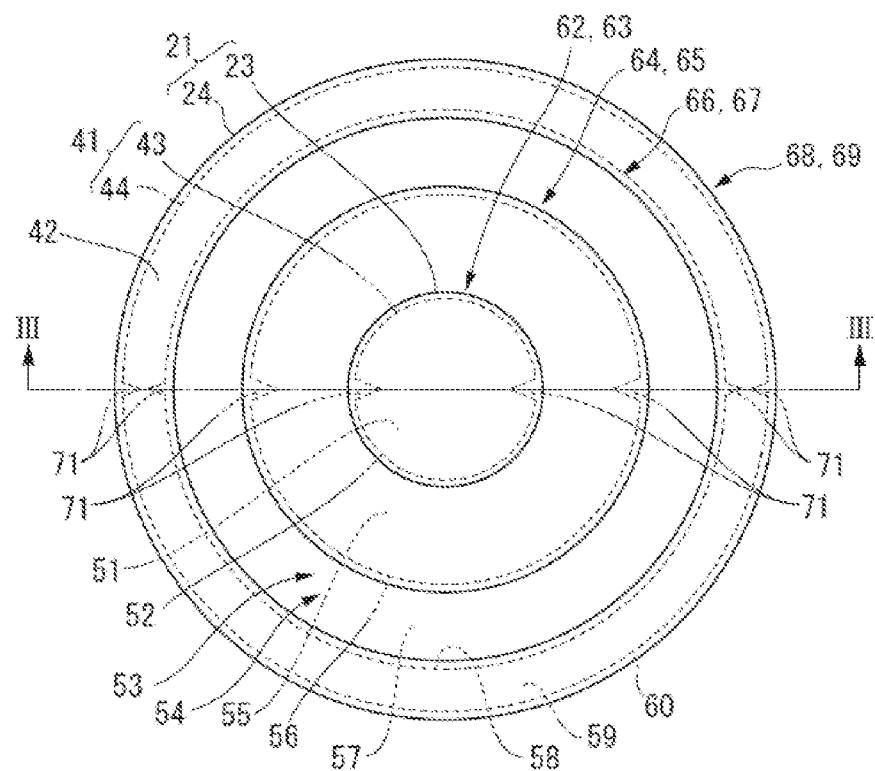
FIG. 2 is a front view of the electropotential detection electrode according to a first embodiment viewed from a pipeline side.
Figure 3:
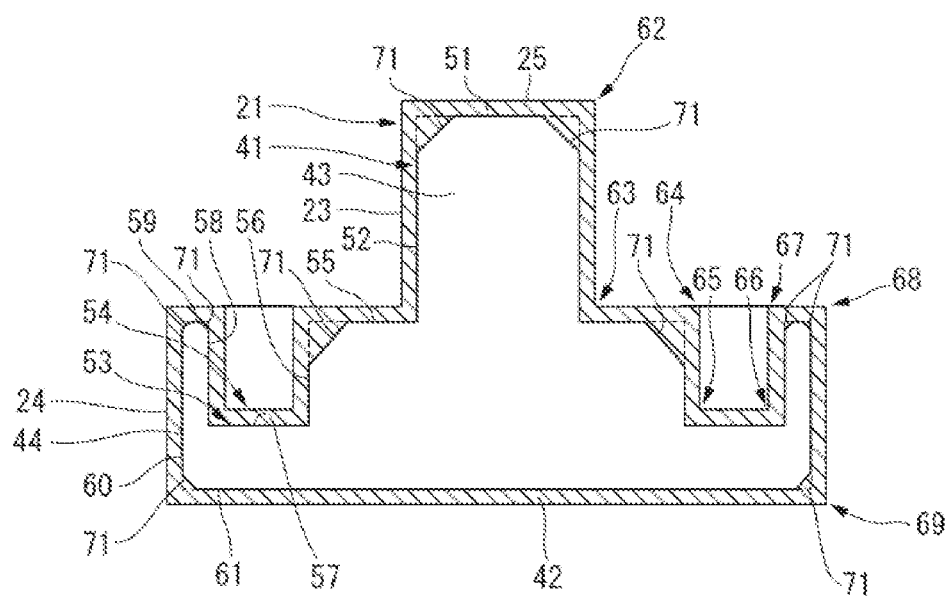
FIG. 3 is a cross-sectional view taken along the line III-III in FIG. 2.

The main body portion 21, which will be described later in detail, comprises a small diameter portion 23 having a cylindrical shape exposed at one end thereof to the fluid path 14 in the measurement tube 13 and a large diameter portion 24 having a disc shape extending from the other end of the small diameter portion 23 outward in the radial direction as illustrated in FIG. 1 to FIG. 3.

The one end of the main body portion 21 is exposed into the measurement tube 13 and corresponds to a liquid-contact portion 25 that comes into contact with a fluid (not illustrated) flowing in the measurement tube 13. The large diameter portion 24 is formed into a disc shape having an outer diameter larger than the small diameter portion 23 and is urged by a spring force of a compressed coil spring 26, described later, toward the electrode mounting seat 18. A gasket 27 is provided between the large diameter portion 24 and the electrode mounting seat 18.

The terminal portion 22 is made of an electrically conductive material into a cylindrical shape and is mounted to the large diameter portion 24 of the main body portion 21 by a mounting structure, not illustrated.

The terminal portion 22 is covered with a cylindrical body 31 made of an insulating material and penetrates through an end wall 17a of the electrode cap 17 and projects out of the electrode cap 17 as illustrated in FIG. 1. The end wall 17a is provided with a through hole 32 formed therethrough and the terminal portion 22 and the cylindrical body 31 pass through the through hole 32. A projecting side end portion of the terminal portion 22 is formed with a screw hole 33 for connecting a lead wire terminal (not illustrated).

The electrode cap 17 has a function to retain the compressed coil spring 26. The electrode cap 17 is screwed into a screw hole 34 of the main body 15 in a state of storing the compressed coil spring 26 in the interior thereof. The compressed coil spring 26 is compressed in a state in which the terminal portion 22 is inserted through a center portion thereof and is stored in the electrode cap 17. One end of the compressed coil spring 26 presses the large diameter portion 24 of the main body portion 21 toward the electrode mounting seat 18 via a washer 35, and the other end pushes the end wall 17a of the electrode cap 17 in a direction opposite from the main body portion 21 via an annular insulating plate 36.

The main body portion 21 of the electrode 11 comprises a base material 41 made of a ceramic, which is an insulating material, and an electrically conductive material covering the base material 41 as illustrated in FIG. 3. In this embodiment, the electrically conductive material covering the base material 41 is simply referred to as a conductor 42. The terminal portion 22 described above is electrically connected to the conductor 42 by being overlapped with the large diameter portion 24 of the main body portion 21. Examples of the ceramic material that may be used for the base material 41 include SiC, $Al_2O_3$, $ZrO_2$, $Y_2O_3$, $Si_3N_4$, and SiO. The base material 41 is formed by molding a ceramic raw material into a shape of the main body portion 21 with a die (not illustrated) and is formed by sintering the molded object.

The conductor 42 is made of an electrically conductive material. Examples of the electrically conductive material that may be used for forming the conductor 42 include metal materials having corrosive resistance, such as Pt, Ti, Au, Ta, and WC, and also include solder, a synthetic resin material having electric conductivity, and an electrically conductive ink. The conductor 42 according to this embodiment is formed by sintering a metal paste (not illustrated) applied to the base material 41 before sintering together with the base material 41. The metal paste is formed by mixing metal powder and a solvent. By sintering the metal paste, the metal powder is sintered and the conductor 42 covering the entire area of an outer surface of the base material 41 is achieved.

The base material 41 of the main body portion 21 is formed of a cylindrical portion 43 constituting the small diameter portion 23 in cooperation with the conductor 42 described above, and a disc portion 44 constituting the large diameter portion 24 in cooperation with the conductor 42 described above. The cylindrical portion 43 and the disc portion 44 are integrally formed.

The cylindrical portion 43 comprises a first end surface 51 having a circular shape and forming one end of the main body portion 21 in an axial line direction (a vertical direction in FIG. 3), and a first side surface 52 formed of a peripheral surface extending from an outer end edge (outer peripheral edge) of the first end surface 51 in the radial direction of the measurement tube 13 (an axial line direction of the main body portion 21) as illustrated in FIG. 2 and FIG. 3.

The disc portion 44 comprises an annular groove portion 53, and comprises a plurality of end surfaces and side surfaces formed of a peripheral surface as described later. The annular groove portion 53 covered with the conductor 42 forms an annular groove 54 in the large diameter portion 24. The annular groove 54 is a groove for storing the gasket 27.

The annular groove portion 53 of the disc portion 44 is located on a coaxial line of the cylindrical portion 43 and the disc portion 44, and is formed into a shape opened toward inside the measurement tube 13. Therefore, the disc portion 44 comprises a second end surface 55 located inside the annular groove portion 53 in the radial direction, a second side surface 56 that forms a peripheral wall surface inside the annular groove portion 53 in the radial direction, a third end surface 57 that forms a bottom surface of the annular groove portion 53, a third side surface 58 that forms a peripheral wall surface outside the annular groove portion 53 in the radial direction, a fourth end surface 59 located outside the annular groove portion 53 in the radial direction, a fourth side surface 60 that forms an outer peripheral surface of the disc portion 44, and a fifth end surface 61 that forms the other end of the main body portion 21.

The first to fifth end surfaces 51, 55, 57, 59, and 61 extend in a direction crossing the radial direction of the measurement tube 13. In this embodiment, the first to fifth end surfaces 51, 55, 57, 59, and 61 are formed vertically to the radial direction of the measurement tube 13.

The first to fourth side surfaces 52, 56, 58, and 60 extend with constant outer diameters in the radial direction of the measurement tube 13.

First to eighth boundary portions 62 to 69 that form boundaries between the end surfaces and the side surfaces are formed on the base material 41 of the main body portion 21 formed, as described above and as illustrated in FIG. 5.

The first boundary portion 62 is formed to project outward of the main body portion 21 at a boundary between the first end surface 51 and the first side surface 52.

The second boundary portion 63 is formed to project inward of the main body portion 21 at a boundary between the first side surface 52 and the second end surface 55.

The third boundary portion 64 is formed to project outward of the main body portion 21 at a boundary between the second end surface 55 and the second side surface 56.

The fourth boundary portion 65 is formed to project inward of the main body portion 21 at a boundary between the second side surface 56 and the third end surface 57.

The fifth boundary portion 66 is formed to project inward of the main body portion 21 at a boundary between the third end surface 57 and the third side surface 58.

The sixth boundary portion 67 is formed to project outward of the main body portion 21 at a boundary between the third side surface 58 and the fourth end surface 59.

The seventh boundary portion 68 is formed to project outward of the main body portion 21 at a boundary between the fourth end surface 59 and the fourth side surface 60.

The eighth boundary portion 69 is formed to project outward of the main body portion 21 at a boundary between the fourth side surface 60 and the fifth end surface 61.

In the first to eight boundary portions 62 to 69, corners projecting outward of the main body portion 21, that is, the first boundary portion 62, the third boundary portion 64 and the sixth to eighth boundary portions 67 to 69 are provided respectively with grooves 71 as illustrated in FIG. 2 to FIG. 5. In the following description, the first, the third, and the sixth to eighth boundary portions 62, 64, and 67 to 69 are collectively referred to as outer boundary portions 72.

The grooves 71 obliquely cross the outer boundary portions 72 and extend in a radial direction and the axial line direction of the main body portion 21. Therefore, one end of each of the grooves 71 is connected to each of the first, second, fourth, and fifth end surfaces 51, 55, 59, and 61, and the other end of each of the grooves 71 is connected to each of the first to fourth side surfaces 52, 56, 58, and 60. The grooves 71 according to this embodiment are provided to divide the outer boundary portions 72 into halves in a circumferential direction as illustrated in FIG. 2. Note that the number of positions to form the grooves 71 is not limited to two positions in the circumferential direction. The grooves 71 may be provided at any number of, but at least one, positions in the circumferential direction, and the number of positions of the grooves 71 in the circumferential direction may be changed as appropriate. The cross-sectional shape of the groove 71 according to this embodiment when viewed from one end side in a longitudinal direction is a V shape. The cross-sectional shape of the groove 71 may be changed as appropriate among shapes such as a semi-circular shape, a U-shape, and a square shape (square groove shape).

Figure 4:
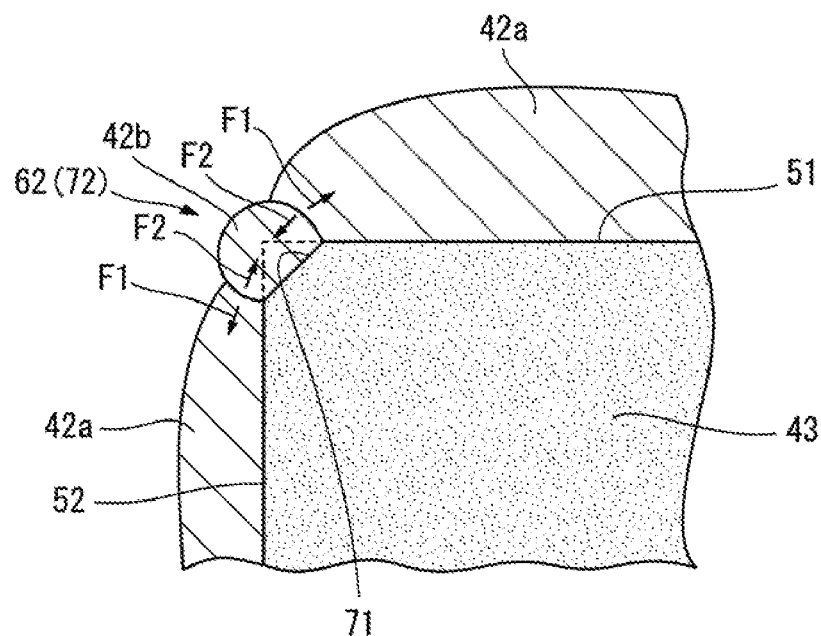
FIG. 4 is a cross-sectional view of the electropotential detection electrode illustrating an outer boundary portion in an enlarged scale.
Figure 5:
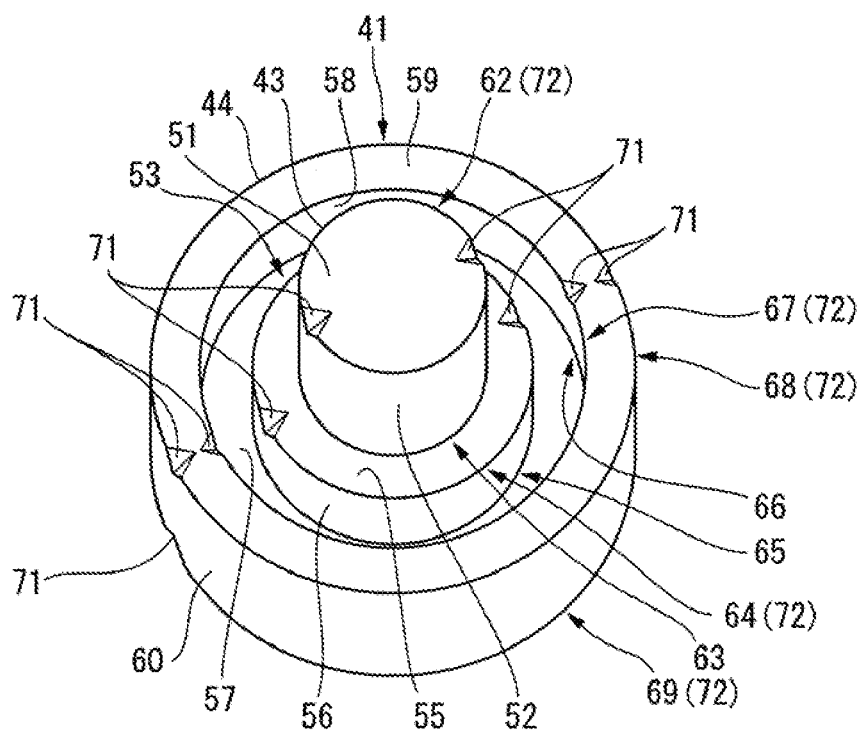
FIG. 5 is a perspective view of a base material according to the first embodiment.

In this manner, with the provision of the grooves 71 formed on the outer boundary portions 72 of the base material 41 of the main body portion 21, when the metal paste that serves as the conductor 42 is applied to the base material 41, the grooves 71 are filled with the metal paste. The metal paste in the grooves 71 is sintered together with other metal pastes applied to the first to fifth end surfaces 51, 55, 57, 59, and 61 as well as the first to fourth side surfaces 52, 56, 58, and 60 of the base material 41. During the sintering of the metal paste, an electrically conductive material 42a made of the metal paste is formed by being sintered on an end surface side and a side surface side of the main body portion 21, and an electrically conductive material 42b made of the metal paste is formed by being sintered in the grooves 71, as illustrated in FIG. 4. Contact angles formed between the electrically conductive material 42b in the grooves 71 and the electrically conductive material 42a formed on an end surface side and a side surface side of the electrically conductive material 42b are smaller than the case of the related art. Therefore, the electrically conductive materials 42a and 42b are easily connected to each other, and a surface tension F1 applied to the electrically conductive materials 42a located on both sides of the groove 71 and a surface tension F2 applied to the electrically conductive material 42b in the groove 71 get balanced out. Consequently, the electrically conductive material 42b stays in the grooves 71 during the sintering of the metal paste, and thus a sufficient thickness of the electrically conductive material 42b in the grooves 71 remains.

The conductor 42 formed by solidification of the electrically conductive material 42a on the first to fifth end surfaces 51, 55, 57, 59, and 61 of the main body portion 21 and the conductor 42 formed by solidification of the electrically conductive material 42a on the first to fourth side surfaces 52, 56, 58, and 60 are connected by the conductor 42 formed by solidification of the electrically conductive material 42b in the grooves 71. Normally, deep projections and depressions on the surface of the electrode of the electromagnetic flow meter 12, if present, result in accumulation of liquid to be measured or turbulence, or accumulation or attachment of foreign substances in a pipe when the electromagnetic flow meter is used as a flow meter. Therefore, such projections and depressions are not desirable. However, by adjusting the relationship between the depth and the width of the grooves 71 formed in the electrode 11 and the viscosity and the thickness of the metal paste, the projections and the depressions of the base material 41 do not remain on the surface of the electrode, and no groove 71 remains on the surface of a finally finished electrode 11.

Therefore, provided according to this embodiment is an electropotential detection electrode of an electromagnetic flow meter, which is capable of achieving sufficient conductivity required for detection of the potential at a corner irrespective of nature of a metal paste even though a conductor manufactured by sintering the metal paste is partly reduced in thickness at the corner.

Second Embodiment

Figure 6:
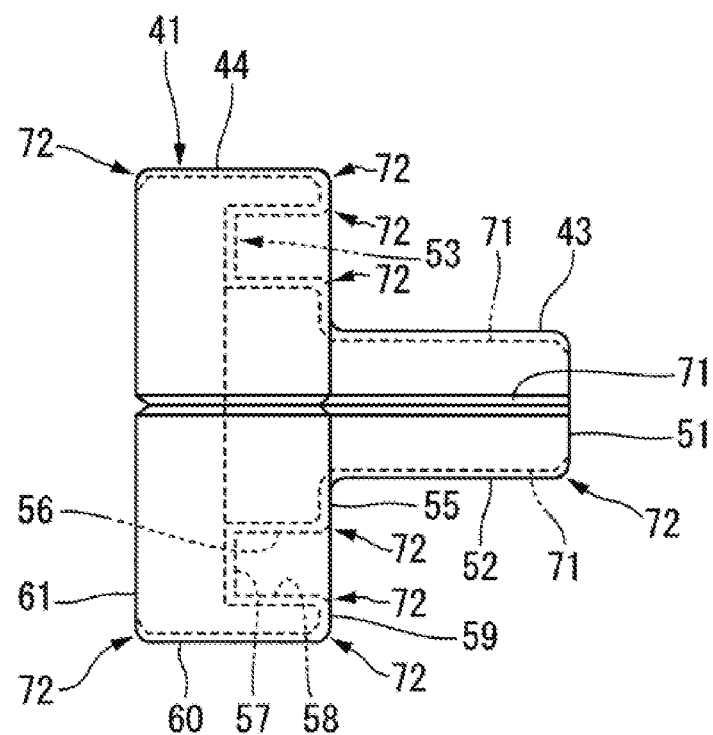
FIG. 6 is a side view of the base material according to a second embodiment.
Figure 7:
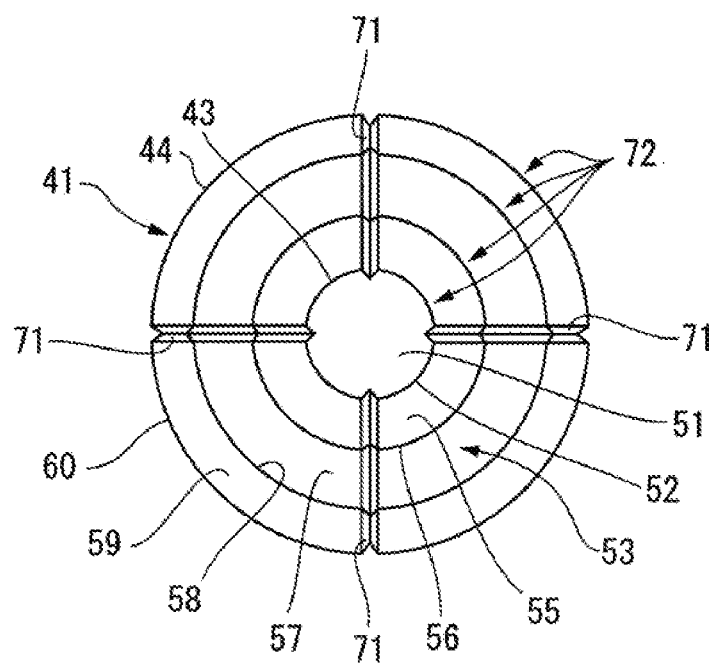
FIG. 7 is a front view of the base material according to the second embodiment viewed from the pipeline side.
Figure 8:
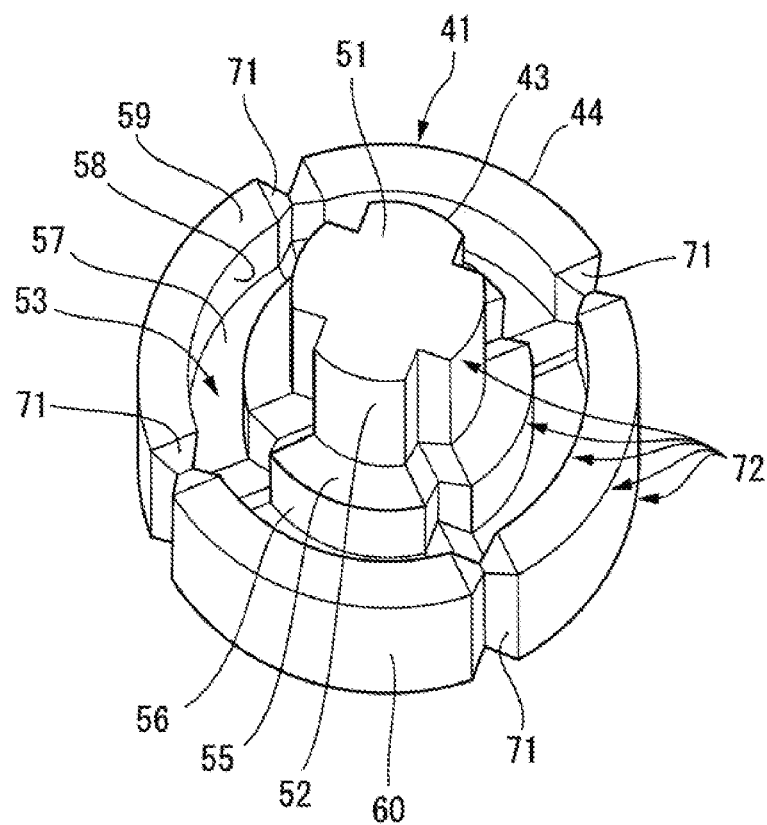
FIG. 8 is a perspective view of the base material according to the second embodiment.
Figure 9:
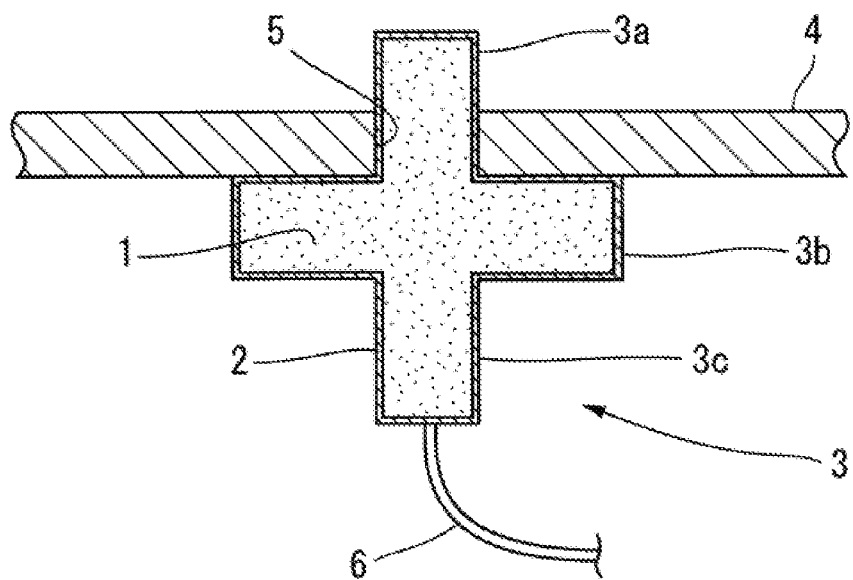
FIG. 9 is a cross-sectional view of an electropotential detection electrode of the related art.
Figure 10:
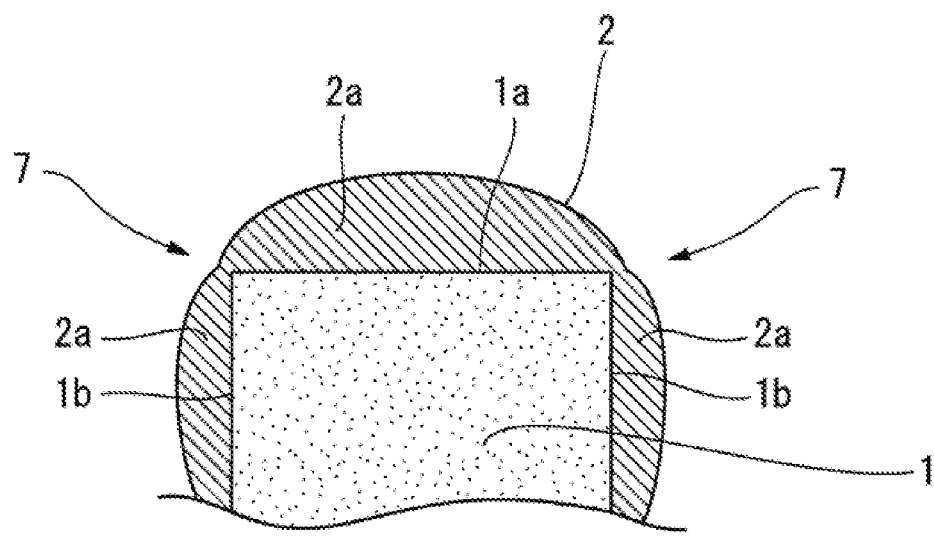
FIG. 10 is a cross-sectional view of the electropotential detection electrode of the related art illustrating a distal end portion in an enlarged scale.

The grooves may have a configuration as illustrated in FIG. 6 to FIG. 8. In FIG. 6 to FIG. 8, the same or similar members as or to those described in conjunction with FIG. 1 to FIG. 5 are denoted by the same reference signs and detailed description will be omitted as appropriate.

The grooves 71 according to this embodiment extend along an outer surface of the base material 41 from the first end surface 51 at the one end in the axial line direction to the fifth end surface 61 at the other end in the axial line direction of the base material 41 without disconnection. Specifically, the grooves 71 extend along the first side surface 52 in a state of opening at one end thereof from the first end surface 51 of the base material 41 to the other end side of the main body portion 21 in the axial line direction of the base material 41, extend across the second end surface 55 in the radial direction, and then reach one end of the second side surface 56. The grooves 71 then extend along the second side surface 56 in the axial line direction of the base material 41, extend across the third end surface 57 in the radial direction, and then extend along the third side surface 58 in the axial line direction of the base material 41. The grooves 71 further extend across the fourth end surface 59 in the radial direction and reach the fourth side surface 60, then extend along the fourth side surface in the axial line direction of the base material 41, and open at the fifth end surface 61.

The grooves 71 are provided respectively at positions that quarter the base material 41 in the circumferential direction, as illustrated in FIG. 7.

Therefore, in this embodiment, conduction paths made of the conductor 42 formed in the grooves 71 are formed from the first end surface 51 at the one end of the base material 41 to the fifth end surface 61 at the other end. Therefore, electrical conduction is ensured from the liquid-contact portion 25 of the main body portion 21 (the conductor 42 on the first end surface 51) to the terminal portion 22, and thus further reliable electropotential detection electrode of the electromagnetic flow meter in terms of reliability of electrical conduction may be provided.

The base material 41 of the main body portion 21 according to the embodiments described above are made of a ceramic. Therefore, the grooves 71 may be formed by using a die for molding the ceramic material into the shape of the main body portion 21. In this manner, by forming the grooves 71 with the die, the base material 41 having the grooves 71 may be manufactured without significant increase in costs.

The outer boundary portions 72 of the main body portion 21 described in the first and second embodiments described above may be formed to have a right angle between the end surface and the side surface. However, the present invention is not limited thereto, and the boundaries between the end surfaces and the side surfaces may be chamfered. Alternatively, the boundaries between the end surfaces and the side surfaces may be rounded.

In examples of the first and second embodiments described above, the small diameter portion 23 having the cylindrical shape and the large diameter portion 24 having the disc shape constitute the main body portion 21. However, the shape of the electropotential detection electrode according to the present invention is not limited to these shapes, and may be changed as appropriate.

DESCRIPTION OF REFERENCE NUMERALS AND SIGNS

11: electropotential detection electrode, 12: electromagnetic flow meter, 13: measurement tube, 21: main body portion, 22: terminal portion, 25: liquid-contact portion, 41: base material, 42: conductor, 51: first end surface, 52: first side surface, 55: second end surface, 56: second side surface, 57: third end surface, 58: third side surface, 59: fourth end surface, 60: fourth side surface, 61: fifth end surface, 62: first boundary portion, 63: second boundary portion, 64: third boundary portion, 65: fourth boundary portion, 66: fifth boundary portion, 67: sixth boundary portion, 68: seventh boundary portion, 69: eighth boundary portion, 71: groove, 72: outer boundary portion

The invention claimed is:

1. An electropotential detection electrode of an electromagnetic flow meter, comprising:
a main body portion having a liquid-contact portion exposed in a measurement tube of the electromagnetic flow meter and being formed by covering a base material with an electrically conductive material; and
a terminal portion electrically connected to the electrically conductive material, wherein the base material comprises:
an end surface extending in a direction intersecting a radial direction of the measurement tube; and
a side surface extending in the radial direction of the measurement tube from an end edge of the end surface, and
a groove is formed at an outer boundary portion between the end surface and the side surface projecting outward of the base material so as to be connected at one end thereof to the end surface and connected at another end thereof to the side surface.

2. The electropotential detection electrode of the electromagnetic flow meter according to claim 1, wherein the terminal portion is made of an electrically conductive material and formed separately from the main body portion, one end of the main body is the liquid-contact portion, the terminal portion is electrically connected to the electrically conductive material of the main body by being overlapped with another end of the main body via the electrically conductive material of the main body, and the groove extends from an end surface of one end of the base material to an end surface of another end of the base material along an outer surface of the base material.

3. The electropotential detection electrode of an electromagnetic flow meter according to claim 1, wherein the base material is made of a ceramic.

* * * * *